Feb. 26, 1963 R. M. McCLINTOCK 3,078,708
TENSILE CRYOSTAT
Filed Aug. 21, 1961
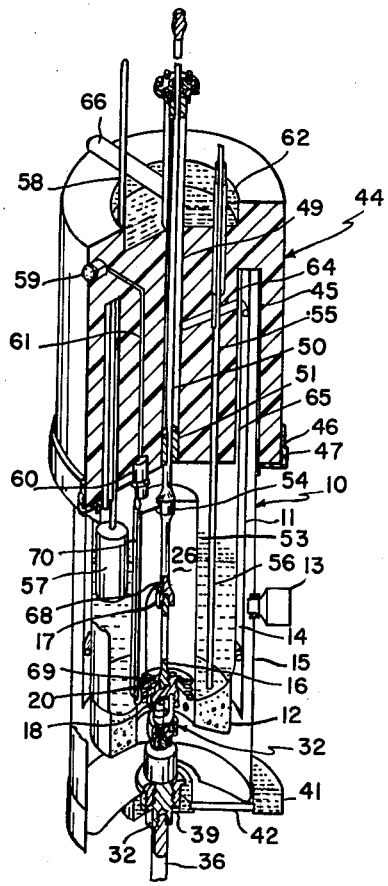
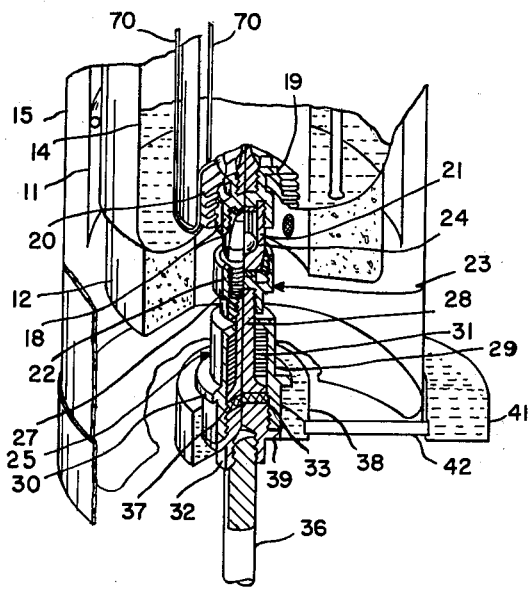
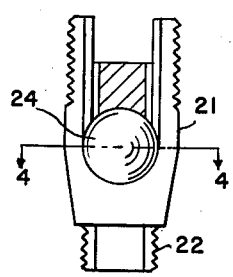
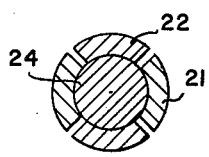
INVENTOR.
R. M. McCLINTOCK
BY
ATTORNEY
AGENT

United States Patent Office 3,078,708
Patented Feb. 26, 1963

3,078,708
TENSILE CRYOSTAT
Ralph M. McClintock, Boulder, Colo., assignor to the United States of America as represented by the Secretary of the Air Force
Filed Aug. 21, 1961, Ser. No. 132,993
2 Claims. (Cl. 73—15.6)
(Granted under Title 35, U.S. Code (1952), sec. 266)

The invention described herein may be manufactured and used by or for the United States Government for governmental purposes without payment to me of any royalty thereon.

This invention relates to a device for use with standard tensile testing machines for conducting low temperature measurements, such as, yield strength, tensile strength, modulus of elasticity, ductility, stress-strain relation and shear strength.

One object of this invention is to provide a cryostat for use with standard tensile testing machines which is capable of obtaining any temperature in a range from between 4° and 300° Kelvin, without the use of an external heat exchanger.

Another object of the invention is to provide a cryostat for use with standard tensile testing machines which provides low liquid hydrogen or helium consumption and wherein substantially all of the gas may be recovered if desired.

A further object of the invention is to provide a cryostat for use with standard tensile testing machines which is portable and simple in construction.

These and other objects will be more fully understood from the following detailed description taken with the drawing wherein:

FIG. 1 shows a partial cutaway view of a cryostat of this invention;

FIG. 2 shows an enlarged view of the lower portion of the cryostat of FIG. 1;

FIG. 3 is an enlarged view partially in section of the interconnecting linkages of the universal joint of FIGS. 1 and 2; and FIG. 4 is a sectional view along the line 4—4 of FIG. 3 showing how the U-shaped members fit around the ball of the universal joint.

The interest in tensile studies of solids at very low temperature has increased in recent years. Basic studies of this kind, in conjunction with other auxiliary methods of investigation, are extremely illuminating in the process toward complete theory of the flow and fracture of metal. At low temperatures, thermally activated processes can be controlled so that other less energetic effects can be observed. Also, in order to study the full effect of radiation on the mechanical properties of the metal, tensile experiments must be carried on at low temperatures since some radiation effects anneal out at temperatures considerably below room temperature. The adiabatic and isothermal elastic moduli of solids are related to the specific heat of the material. It would, therefore, be helpful to have reliable isothermal measurements of the moduli of metal at low temperatures to compare with adiabatic measurements which have been made so as to verify their relationship. Also, the recent use of liquid hydrogen as a rocket fuel has necessitated procurement of design data on engineering materials at low temperatures. Various measurements such as the yield strength, tensile strength, modulus of elasticity, ductility, stress-strain relation and shear strength may be obtained by the use of the cryostat of this invention.

Referring more particularly to FIGURE 1 of the drawing, the basic unit of the cryostat is a standard commercial stainless steel dewar vessel 10. This vessel is a double-walled dewar vessel having a radiation shield 11 located therein and charcoal getter material 12 located in the base of the inner container of the dewar vessel. This is a standard commercial dewar vessel which may be obtained from the Hoffman Laboratories, Inc. This vessel has a standard evacuation valve 13 for evacuating the space between the inner can 14 and the outer can 15 of the dewar vessel 10. For this purpose a standard vacuum pumping system may be attached to the valve 13.

A test specimen indicated at 16 is mounted between two chucks 17 and 18. Specimen holders other than those shown may be desirable in certain tests. A stainless steel bellows 20 is welded between the bottom of the inner can 14 and a flange 19 on the lower chuck 18 to provide a hermetic seal so as to isolate the vacuum between the inner can 14 and the outer can 15 from the test chamber indicated at 26. The lower chuck 18 comprises a portion of a universal joint 23 having a ball bearing 24 located therein.

The universal joint 23 has two substantially U-shaped elements 21 and 22 which, when interlocked, hold the ball bearing 24 in the manner shown in FIGS. 3 and 4. The U-shaped member 21 is threaded into the lower chuck 18 and the U-shaped member 22 is threaded into a coupling member 27. The universal joint is to minimize the bending loads on the specimen 16. Test forces are applied to the specimen through a multiple contact linkage indicated generally at 25. The multiple contact linkage has a central stud 28 threaded into coupling member 27. The outer can of the dewar vessel is sealed to flange 30 on the outer retainer 29. A plurality of stainless steel washers 31 surround the central stud 28 and are located within the outer retainer 29. The outer retainer 29 is connected to a threadable coupling member 32. The test forces are applied to the coupling member 32 by means of a shaft 36 threadably connected to the stud 32. The central stud 28 has a flange 33 thereon for retaining the washers. A polytetrafluoroethylene disk 37 is located between flange 33 and coupling member 32 to absorb some of the shock produced when a test specimen fractures in the cryostat. The multiple contact linkage will increase the resistance to heat flow because of the many contact surfaces between the washers in the stack. To further reduce the heat conducted into the cryostat through the lower linkage, a plastic container 38 surrounds the lower end of the outer retainer 29 and is sealed to a flange 39 on stud 32. The plastic container 38 is connected to a kidney-shaped pool 41 by means of a tube 42. The pool 41 is filled with liquid nitrogen or other refrigerating agent which is then supplied to the container 38 by means of tube 42.

A rigid foamed polystyrene cover 44 fits over the top of the dewar vessel 10. An annular slot 45 is formed in the cover 44 to receive the dewar vessel 10 so that the cover fits over the outside of the dewar vessel a distance approximately six inches from the top and extends into the inside of the vessel a like distance. A metal ring 46 soldered to the outside of the dewar vessel 10 receives the cover 44 and a seal is provided by means of a tight fitting thin rubber garter 47. A central opening 49 is provided in the cover to receive the upper tension rod 50 which is integral with the upper chuck 17. A neoprene ring 51 surrounds the tension rod 50 and is located in the central opening 49 to provide an upper seal for the test chamber. An inverted can 53 is secured to the upper tension rod at 54 by any well known means, for example, by means of a threaded boss on rod 50. The inverted can 53 extends to a point adjacent but spaced from the bottom of inner can 14 as shown in FIG. 2. A vertical cylindrical channel 55 is provided in the cover 44 into which a transfer tube 56 may be inserted for filling or removing a cooling material such as liquid hydrogen. The cooling material fills the space between the inverted can 53 and the inner can 14 of the dewar vessel. The connection between the inverted can 53 and tension rod 50 should be sufficiently tight to keep the cooling material from entering the inside of can 53. A float 57 may be fastened to an indicating rod 58 which passes through another vertical hole (not shown) in the cover. Rod 58 should be covered with a tube, closed at its upper end, to prevent leakage of evaporated coolant. Electrical plugs 59 and 60 connected by means of a lead 61 passing through the cover 44 are provided for making any desirable electrical measurements within the cryostat. A depression 62 in the top of cover 44 may be filled with liquid nitrogen to reduce the heat transfer to the inner test chamber of the cryostat. To make use of the heat which can be absorbed by vaporized liquid, four radial holes 64, one of which is shown, are provided between the central opening 49 and the space 65 which exists between the dewar vessel and the cover. Heat is absorbed by the vaporized liquid both in the central opening 49 and the space 65. A vent tube 66 which connects with an extension connected to the central opening 49 may be provided as a means for recovering the vaporized liquid. Temperature control within the test chamber may be provided by means of a pair of heaters 68 and 69 which surround the upper and lower chucks 17 and 18, respectively. Power for the heaters may be supplied over lead 70 which may also be connected to plug 60 and to the outside through lead 61. The desired temperature control may be provided in any manner desired as, for example, by individually adjustable transformers which would be connected to the heaters 68 and 69 through leads 61 and 70. The particular means used to control the current to the heaters however form no part of this invention. Automatic control of the temperature of a specimen may be provided by means of thermocouples attached to the specimen which may be used to control the power applied to the heaters in any manner well known in the art. A heating element may be located in the bottom of the inner dewar to evaporate the cooling material remaining in the cryostat after the major portion of the cooling material has been removed, if desired. Also various measuring devices may be located in the test chamber, if desired.

There is thus provided a device for use with standard tensile testing machines for conducting low temperature tests.

While certain specific embodiments have been described in detail, it is obvious that certain changes can be made without departing from the general principle and scope of the invention.

I claim:

1. A device for use with standard low temperature testing apparatus comprising; a dewar vessel having an inner can, an outer can, a radiation shield and charcoal getter therein and an evacuation valve thereon; a plastic foam insulating cover for said container; said cover having an annular slot therein for receiving the upper portion of said dewar vessel; a central cylindrical hole in said cover; an inverted can within said inner can to thereby provide a test chamber within said inverted can and a space for cooling material between said inverted can and the inner can of said dewar vessel; a first and second specimen holding chuck within said inverted can; a first means, passing through said central hole in said cover and integral with the first chuck, for supplying test forces to said test specimen; means for providing a heat seal between said test force supplying means and said cover; a second means for applying test forces to the second of said chucks; a high heat flow resistance coupling connected between said second test specimen holding means and said second test force applying means; said coupling including a universal joint connected to said second chuck and a multiple contact linkage; said multiple contact linkage including a central shaft having a flange thereon connected to said universal joint, an outer retainer, a plurality of washers surrounding said central shaft and located between said flange on said shaft and said outer retainer, and a coupling member connected between said second force applying means and said outer retainer; means connected between said second chuck and the bottom of said inner can for sealing the test chamber from the space between the inner and outer can of said dewar vessel; a seal between said outer retainer and said outer can to thereby provide a vacuum space between the inner and outer can; a heating element on each of said specimen holding means and a means for connecting a power source to said heating elements.

2. A device for use with standard low temperature testing apparatus comprising; a dewar vessel having an inner can, an outer can, a radiation shield and charcoal getter therein and an evacuation valve thereon; a plastic foam insulating cover for said container; said cover having an annular slot therein for receiving the upper portion of said dewar vessel; a central cylindrical hole in said cover; channel means between said annular slot and said central cylindrical hole for passage of vaporized liquid from said testing apparatus to thereby permit the vaporized liquid to absorb incoming heat; an inverted can having a hole in the bottom within said inner can to thereby provide a test chamber within said inverted can and a space for cooling liquid between said inverted can and the inner can of said dewar vessel; a first and second specimen holding chuck within said inverted can; a first means, passing through the hole in said inverted can and the central hole in said cover and integral with the first chuck, for supplying test forces to said test specimen; means for sealing said test force supplying means into the hole in said inverted can; means for providing a heat seal between said test force supplying means and said cover; a universal joint connected to said second chuck; a multiple contact linkage; said multiple contact linkage including a central shaft connected to said universal joint; a flange on said central shaft; an outer retainer; a plurality of washers surrounding said central shaft and located between said flange on said central shaft and said outer retainer; a coupling member connected to said outer retainer; shock absorbing means between said flange on said central shaft and said coupling means; a second means, connected to said coupling means for applying test forces to said second chuck; means connected between said second chuck and the bottom of said inner can for sealing the test chamber from the space between the inner and outer can of said dewar vessel; a seal between said outer retainer and said outer can to thereby provide a vacuum space between the inner and outer can; a heating element on each of said specimen holding means and a means for connecting a power source to said heating elements.

References Cited in the file of this patent

UNITED STATES PATENTS 2,154,280     Nadai et al.               Apr. 11, 1939

OTHER REFERENCES

Wessel: A.S.T.M. Bulletin No. 211, pp. 40–46 (1956). (Copy in Scientific Library.)

Eeles: Proceedings of the 1957 Cryogenic Engineering Conference, Chemical Engineering Dept. University of Colorado (August 1957). (Copy in Scientific Library.)